Figure 1:
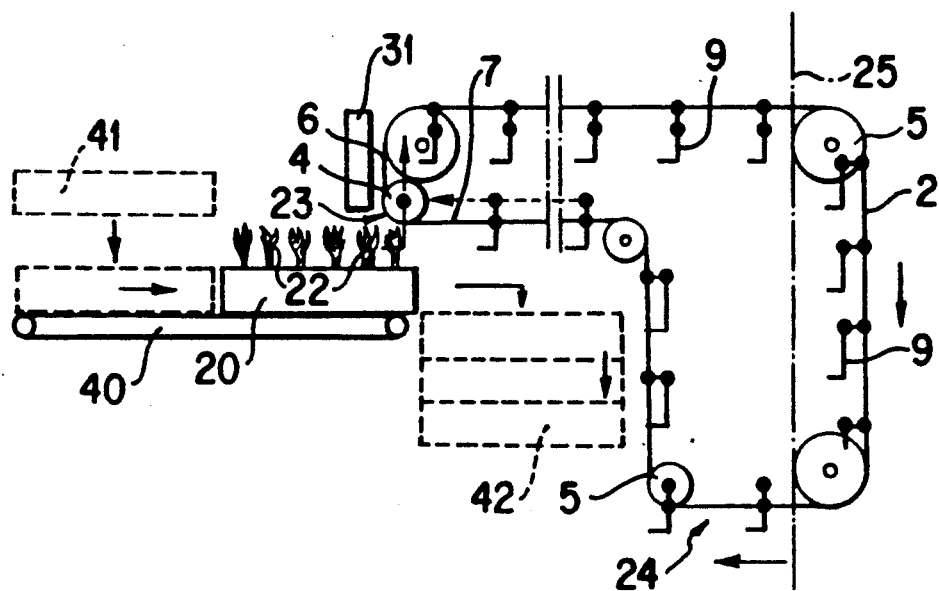

United States Patent [19]

Bikow

[11] Patent Number: 5,160,235

[45] Date of Patent: Nov. 3, 1992

[54] APPARATUS FOR RELOCATING ARRANGED PLANTS

[75] Inventor: Nikolaus Bikow, Innsbruck, Austria

[73] Assignee: Visser's-Gravendeel Holding B.V., Netherlands

[21] Appl. No.: 845,363

[22] Filed: Mar. 5, 1992

Related U.S. Application Data

[63] Continuation of Ser. No. 501,890, Mar. 30, 1990, abandoned.

[30] Foreign Application Priority Data

Mar. 31, 1989 [AT] Austria .................. 741/89

[51] Int. Cl.⁵ .............................. A01C 11/02
[52] U.S. Cl. .................... 414/416; 294/116; 198/476.1; 198/477.1; 111/105; 221/219
[58] Field of Search ............. 414/403, 416, 591, 609, 414/618, 624, 625, 626; 198/476.1, 477.1; 294/116; 221/219; 111/104, 105; 901/21

[56] References Cited

U.S. PATENT DOCUMENTS

| | | |
|---|---|---|
| 2,831,442 | 4/1958 | Montguire . |
| 3,069,035 | 12/1962 | Schwarz et al. ............ 294/116 X |
| 3,126,222 | 3/1964 | Stuart ...................... 294/116 X |
| 3,944,058 | 3/1976 | Strauss .................... 414/626 X |
| 4,028,039 | 6/1977 | dePutter ................... 414/416 X |
| 4,103,884 | 8/1978 | Kawashima ............... 414/626 X |
| 4,104,975 | 8/1978 | Ingram et al. ............. 221/219 X |
| 4,257,727 | 3/1981 | Peyton ...................... 414/416 |
| 4,262,795 | 4/1981 | Hecker ..................... 414/416 X |
| 4,355,588 | 10/1982 | Armstrong et al. ........ 111/105 X |
| 4,396,109 | 8/1983 | Nambu ...................... 198/476.1 X |
| 4,402,541 | 9/1983 | Bomberger et al. ........ 294/116 X |
| 4,443,151 | 4/1984 | Armstrong ................ 111/105 X |
| 4,750,439 | 6/1988 | deGroot .................... 414/416 X |
| 4,892,185 | 1/1990 | Guardiola ................. 198/477.1 |

FOREIGN PATENT DOCUMENTS

| | | | |
|---|---|---|---|
| 3644130 | 7/1988 | Fed. Rep. of Germany . | |
| 1070028 | 7/1954 | France . | |
| 2547158 | 12/1984 | France . | |
| 375047 | 3/1973 | U.S.S.R. ............... | 111/104 |
| 383423 | 5/1973 | U.S.S.R. ............... | 111/104 |
| 520534 | 4/1940 | United Kingdom ..... | 111/104 |
| 520535 | 4/1940 | United Kingdom ..... | 111/104 |
| 937300 | 9/1963 | United Kingdom ..... | 111/104 |
| 939121 | 10/1963 | United Kingdom ..... | 294/116 |
| 1557004 | 12/1979 | United Kingdom . | |

Primary Examiner—Michael S. Huppert
Assistant Examiner—Robert S. Katz
Attorney, Agent, or Firm—Wegner, Cantor, Mueller & Player

[57] ABSTRACT

To relocate cutlings (22) contained in plant boxes (20), an endless transport element (2) with grippers (9) is used, which grip on a pick-up position (23) the plants (22) at their stems and transport these to an unload position comprising a direction changing wheel (4). To pull out the plants (22) as far as possible in the direction of growing and particularly vertically, every gripper (9) is rotatably journalled on a carrier (8) provided on a transport element (2). The distance between the gripper bearing (17) in the area of the pick-up position (23) and the shaft of the direction changing wheel (4) is substantially smaller than the radius of said direction changing wheel. Hence the plants (22) gripped by the gripper (9) are pulled out in essentially the grind direction thereof.

14 Claims, 4 Drawing Sheets

APPARATUS FOR RELOCATING ARRANGED PLANTS

This application is a continuation of U.S. application Ser. No. 07/501,890, filed Mar. 30, 1990, now abandoned.

The invention relates to an apparatus for relocating arranged plants, which are gripped one by one on a pick-up location, the apparatus comprising:

a transport element, making an endless movement and being guided in a frame along direction changing guiding elements, which transport element comprises at least a gripper with two spreadable grip-fingers, in which each gripper grips the plant including the rootball at the pick-up location, and releases it at the unload location.

For bedding out, and planting out of cutlings, being grown in plant containers, several planting apparatusses are known. These transport the plants by means of an endless transport element from the pick up position to the unload position, which is directly above the soil. The endless transport elements, like plant wheels, transport chains etc. comprise sprung grippers, which grip rootballs to be bedded out, and release these at an unload position. Such an apparatus is for instance known from EP-B-40337.

The plants to be planted out are usually grown up in plant boxes, which comprise a substantial number of plant cavities arranged in longitudinal and transverse rows. The problem exists to take the plants from the plant cavities and to make these available for the planting machine, so that they can be gripped by the gripper. A solution is known from EP-B-43427, according to which a plant box, comprising apertures in its bottom, is put into a vertical frame and is guided along pushing elements, which are pushed through the apertures in the bottom into the plant boxes, so that the root ball with the plant is shifted into the container of an endless magazine. Consequently this is moved stepwise to the pick-up position of the gripper, where the grippers grip the plants.

The aim of the invention is to supply an apparatus according to the type mentioned in the preamble, which allows to grip the plants by a gripper directly in the plant container.

This aim is reached, in that each gripper is rotatably suspended in a carrier element connected with the transport element, in which the rotation shaft is parallel to the axis of curvature of the direction changing guiding element, and that the gripper bearing is guided on the pick-up location in the growing direction of the plants over a range being substantially equal to the pick upheight of said plants.

By this embodiment it is achieved that the gripper bearing follow the direction changing of preferably 90 degrees between the part of the transport element leading to the pick-up location and the part leading away therefrom follows a path, which has only a limited component in the pull direction, in which the gripper does not change its direction parallel to the growing direction. This allows to grip the plant directly at its stem above the rootball by means of a gripper located at the end of the part of the transport element leading to the pick-up position, and to pull it inclusive its rootball from the plant container.

Just as well cutlings can be loaded on stretch as is shown by the removement by hand thereof, so that they can be removed by a machine, when care is taken, that in particular at a moment of pulling of the rootball from the plant holder, the transverse forces on the stem are kept as small as possible. Thus an intermediate step, in which the plants are lead to a position, in which they can be gripped at the rootball, is made superfluous, so that the construction of the plant apparatus can be simplified substantially.

According to a preferred embodiment, the gripper bearing and the axis of curvature of the direction changing guiding elements, is smaller than the radius of the direction changing guiding elements, and that the part of the transport element leading away from the direction changing guiding element is substantially parallel to the growing direction of the plants.

The dimension of this distance is adapted to the shape of the rootball to be pulled out, as the component of the path being in the supply direction can be marginally bigger in case of a conical rootball than in case of a cylindrical rootball. The gripper bearing can also be in the axis of curvature, so that the gripper bearing moves exactly over an angle at the direction changing of the transport element. This implies a sudden stop during the direction changing of the carrier with a consequent sudden acceleration, which could lead to damaging of plants when they are very firmly located in the plant container. During practical tests, it has appeared that the distance between the gripper bearing and the axis of curvature in the order of magnitude of 5%–30% of the length of the radius of the direction changing guide is particularly attractive, as no sudden stop occurs, the diversion in the perpendicular direction is small, and a seperate guide for the gripper, resp. the bearing thereof becomes superfluous.

According to a further preferred embodiment, the transport element comprises a pair of transport chains guided mutually parallel by direction changing wheels, each chain comprising a carrier for every gripper, in which the shaft of rotation is journalled.

The gripper is located in the middle between the transport chains, so that the positioning of the rotation shaft does not imply any constructive problems.

A preferred gripper comprises two multiple folded gripfingers, each comprising a bearing extending parallel to the transport element, a clamping element and a spreading element, in which an elastic element, in particular a spring urging the clamping parts to each other has been provided between the gripping fingers.

This leads to an attractive balance position, when the spread parts and the clamping parts extend in the direction opposite the bearing parts, in which the bearing parts are journalled rotatably in a guide bracket, in which the rotation shaft is journalled.

The apparatus according to the invention can be used as a trailer on wheels for a traction vehicle for planting in rows on the field, but it can also be used as a fixed apparatus for the planting out of potplants, etc. Depending on the embodiment of the planting apparatus, the supply store of the plants to be planted out can be provided in different ways. The apparatus according to the invention is adapted to the position of the plant container, so that the path of movement of the gripper extends substantially in the grow direction. This can also be horizontally in case of a planting apparatus.

In a preferred embodiment the part of the transport element leading away from the pick-up position, extends in vertical direction, on that the plants can be taken from a plant container located on a horizontal base.

This embodiment is in particular fitted for plant containers in shape of flat plant boxes with a substantial number of plant cavities in longitudinal and in transverse rows, which, depending on the sort of plant, can contain different numbers of plant cavities (several hundreds) with different sizes and distances, whereas the outside dimensions are generally normallised. For the picking up of the plants from such plant boxes the plant box is movable in the area of the pick-up position and a frame of the transport element is pivotable around a shaft, in which a plant cavity is located in the pick-up position. For the gripping of the two-dimensional relative movement from the pick-up position, necessary for the gripping of all plants is devided such, that the frame is moved along the perpendicular rows and that the plant box is moved in the direction of the longitudinal rows.

Preferrably the pivot shaft of the frame extends parallel to the direction of growth. The pivot of the transport element over the pitch between the longitudinal rows is preferrably caused by a control element, which is controlled by the transport element.

According to an embodiment, the controller comprises a guide plate for every pitch between the longitudinal rows, and all guide plates are pivotable in parallel between two slanting positions, and every gripper comprises a controller pin, which makes the frame pivot over the pitch between longitudinal rows when it is being guided by a guide plate. At every turning position of the pivot movement the plant box has to be moved over a pitch of a transverse row to the front, so that subsequently two plants can be gripped from the outer longitudinal rows.

A further embodiment provides, that on both sides outside the stack of parallel guide plates a pivot arm has been provided, which is pivotable through the controller pin from an active initial position to a passive terminal position in which the pivot of the pivot arm brings said stack of guide plates from the first slanting position to the second slanting position, and that the second rotation arm provided at the other side rotates from the passive terminal position to its active initial position. A kinematic simple coupling of movement can be provided in that to the shaft of rotation of both outer guide plates, a chain wheel has been provided, which is surrounded by the closed chain, and that the inner guide plates are connected with the outer guide plates by means of coupling rods.

The control element can be provided at every position along the transport element. As the relevant angles of rotation are very small, the control element is preferrably provided in the vincinity of the part leading away of the transport element, in which the control pin of the transport chain extends outwardly, so that a very accurate pivot guiding is provided.

The guiding of the pivot arm located at the outer side from its active to its passive oblique position, can according to a preferred preamble also be used to shift the plant boxes forwardly.

The pivot of the frame implies a movement of the pick-up position according to circular arc. Depending on the angle of pivot and the length of the frame, the difference between the pick-up position of the circle arc and the plant cavity in the forward perpendicular is a measure for the diversion between the pull direction of the plant and the grow direction thereof.

A preferred embodiment for the correction of this deviation implies that at the pick-up position the direction changing guide, the bearing resp. of the direction changing shaft is shiftable in dependance of angle of pivot, and that another direction changing guide has been provided as a compensation thereof. With increasing angle of rotation, the distance between the direction changing guide and the bearing resp. of the direction changing shaft is enhanced in relation to the pivot shaft. Therefore the direction changing guide can be provided on a carriage, of which the shifting in the longitudinal direction is guided by a guide, extending perpendicular, and which has been provided with the necessary curvature, and which insures parallel guiding of the pick-up position.

Preferrably the direction changing guide at pickup position and the direction changing guide following in the direction of transport are provided on a pointer. As an alternative, the other direction changing guide could be provided on the way of a chain stretcher, being elastically resilient.

Further it is also possible to achieve the deviation between the arc of curvature and the transverse rows by means of correction movements of the plant box. During the further path of the transport element until the unload position no further features on the direction changing guiding are necessary. Preferrably the radius of the direction changing guide or of the direction changing wheel at the pick-up position is smaller than the radius of the other direction changing guide, of the direction changing wheels resp. to the unload position. This enlarges the distance of the gripper bearing by every direction changing guide, so that a smoother transport of the plants to the unload position is provided for. Whereas the gripper extends perpendicular to the shaft of rotation and is elastically resilient, shocks and vibrations are damped.

Subsequently an embodiment of the invention will be elucidated with the help of the figures in the accompanying drawings.

Figure 2:
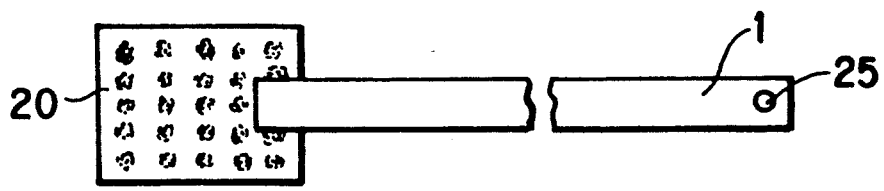
Figure 3:
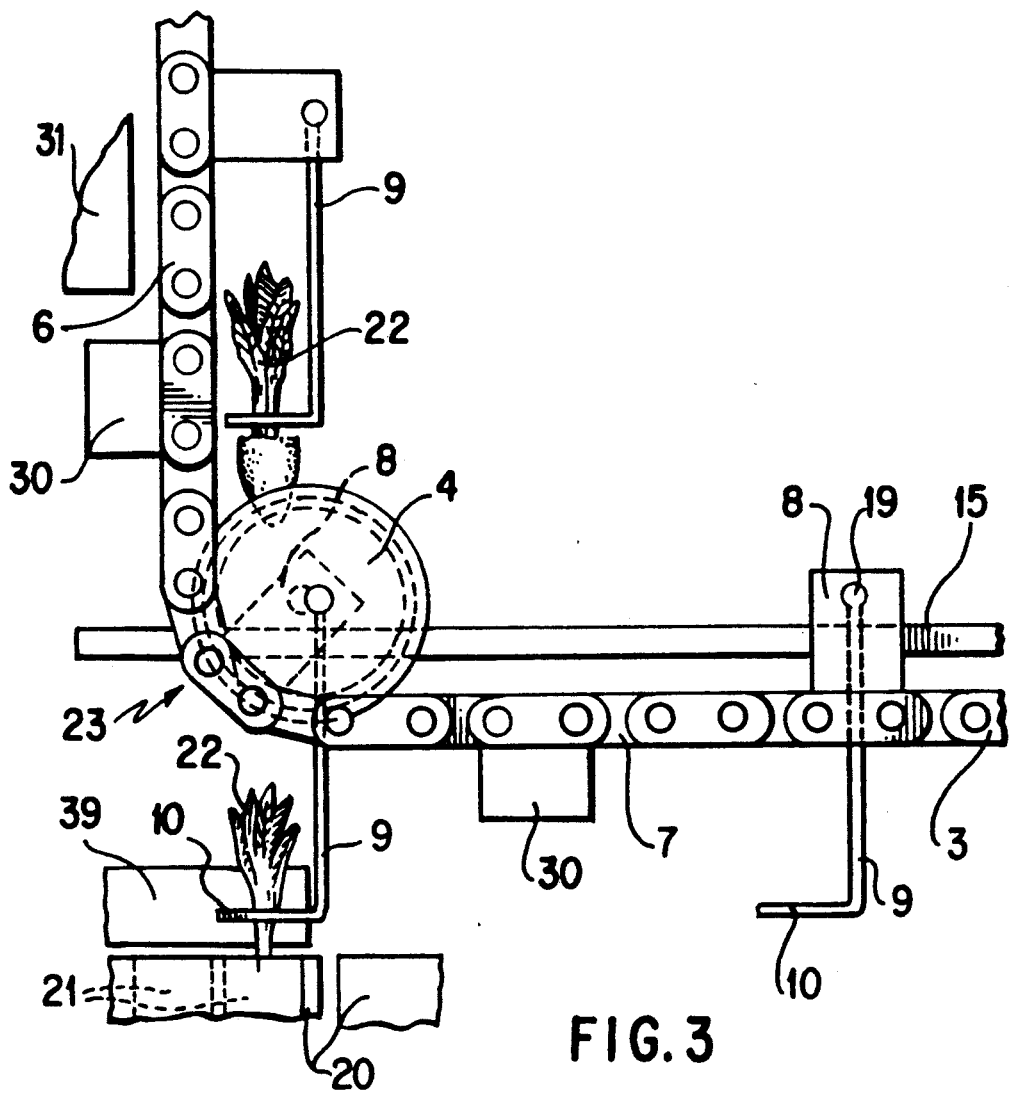
Figure 4:
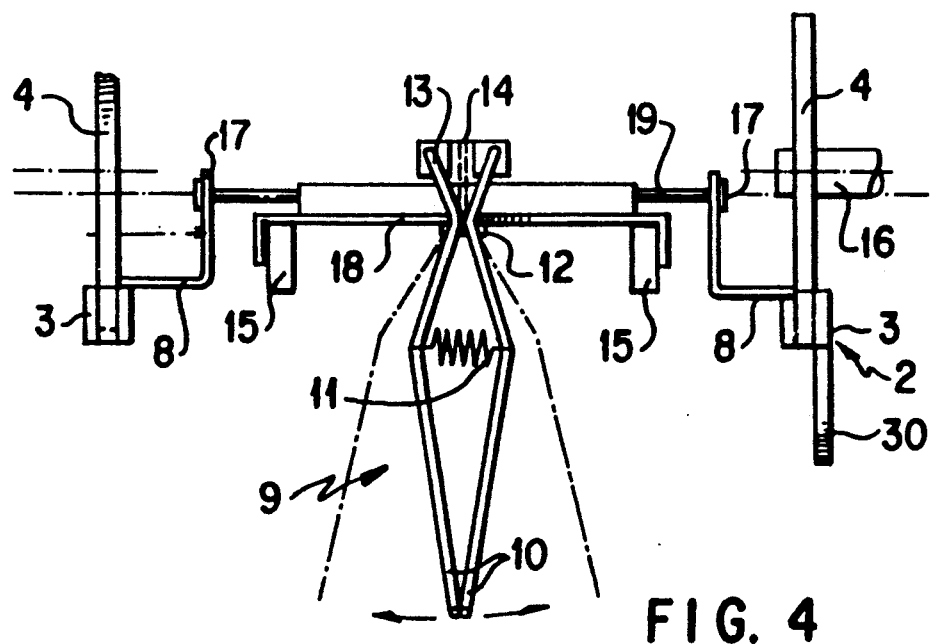
Figure 5:
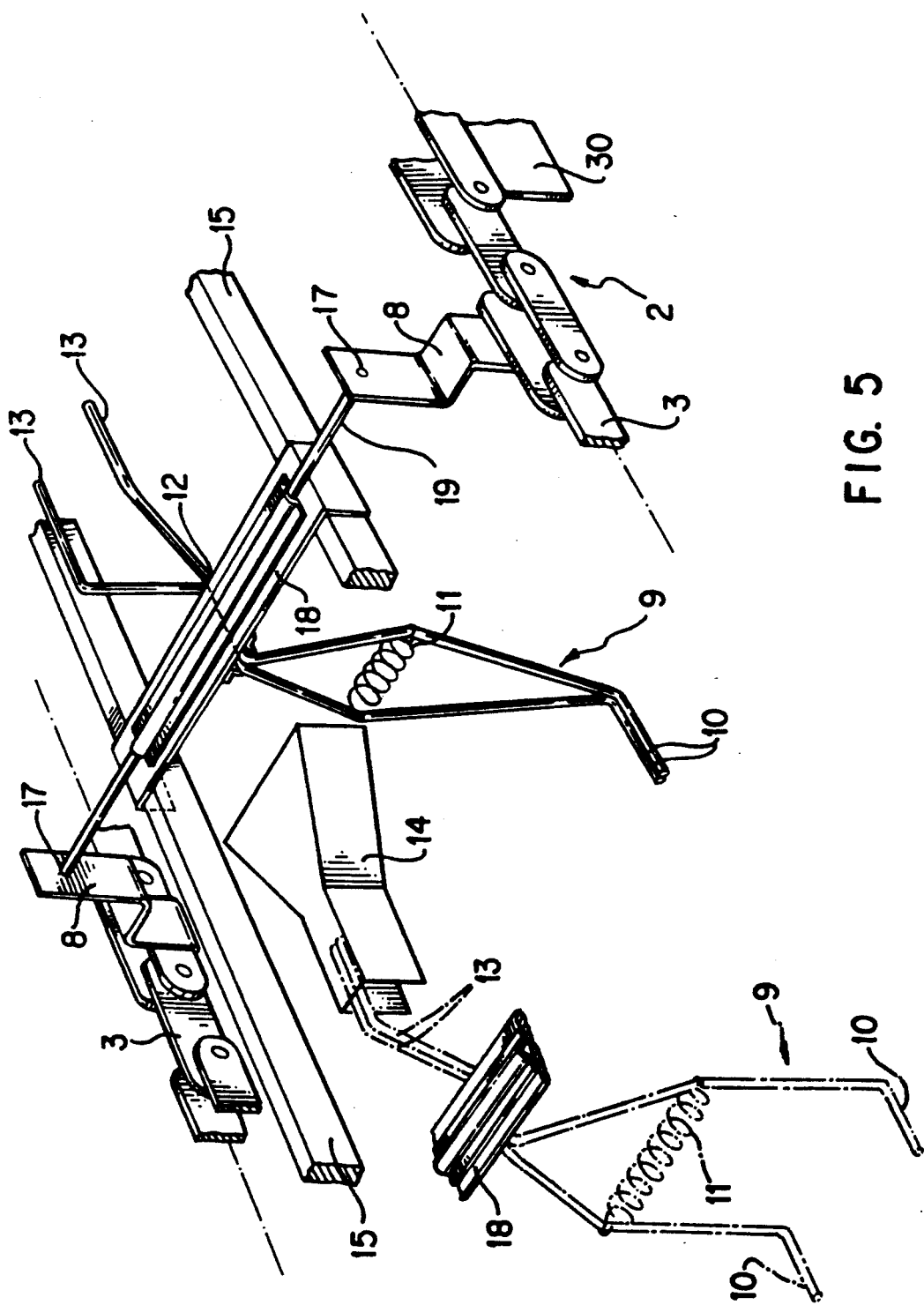
Figure 6:
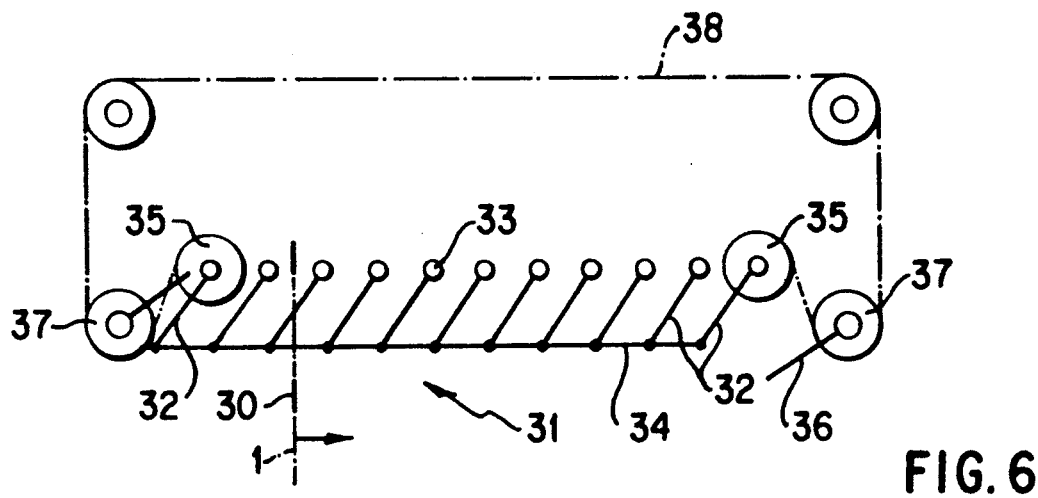
Figure 7:
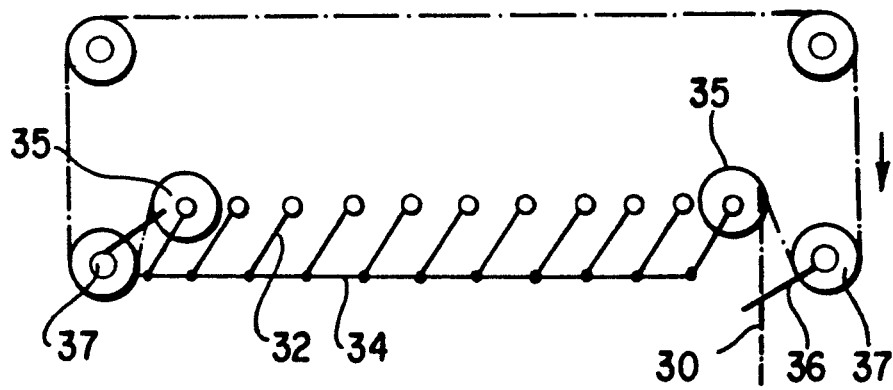
Figure 8:
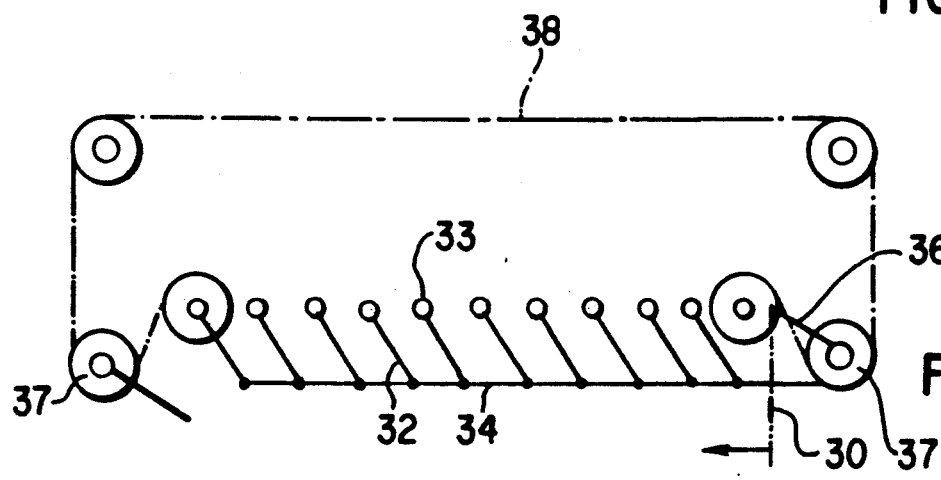

FIG. 1 shows a schematic side view and FIG. 2 a top view of a plant machine, which can be connected with a traction vehicle, which plant machine comprises five parallel relocation apparatus, which have been depicted in FIG. 3 in detail in the area of the pick-up position, in which FIG. 4 is a top view from the appartus depicted in FIG. 3 and in which FIG. 5 is an obligue view of the grippers in the closed and the open position, and in which FIG. 6 to 8 show the path of movement of the control unit.

An apparatus for the relocation of plants 22, which have been provided in plant cavities 21, arranged in longitudinal and transverse rows (FIG. 3) of the plant box 20 comprises a transport element 2 (FIG. 1) moving in a closed circuit in a frame 1 (FIG. 2). This transport element 2 is being guided through direction changing guides in the shape of direction changing wheels 4, 5, in the plain of the frame and comprises grippers 9, which grip the plants 22 at the stems thereof at a pick-up position 23, and transport these to an unload position 24. At the pick-up position 23 the plant boxes 20 stacked in a store holder 41 as supplied by means of a transport unit 40, in which fixed separating walls 39 between the rows of plants 22 extending in the longitudinal direction facilitate the gripping thereof, and move these plant boxes 20 emptied to a dispose position 42. The part 7 of the transport element 2 leading to the pick-up position extends perpendicular to the pick-up position 23, and the direction thereof is changed by the direction changing wheel 4, in which the part 6 of the transport element 2 leading from the pick-up position extends in vertical direction in the growing-direction and pull out-direction, respectively, of the plants 22. The part 6 leading away comprises a control unit 31, which causes pivot of the frame 1 around a vertical pivot 25, which has been provided in the vincinity of the unload position 24. By pivoting the frame 1 on the pivot 25 and possibly transport of the bearing from the shaft 16 of the direction changing wheel 4, after the picking up of the plant 22, for the next gripper 9 a pick-up position is reached, which coincides with the plant cavity 21 of the following plant 22 in every transverse row. After the emptying of the transverse row transport of the plant box 20 takes place over a pitch between transverse rows by means of the transport unit 30, so that subsequently the next transverse row can be emptied.

As appears from FIG. 3 to 5, the transport element 2 comprises preferrably a number of transport chains 3, which are located on a distance from each other, to which carriers 8 have been provided for every gripper 9. As is depicted, these carriers extend in the supplying transport part 7 of the transport element leading to the pick-up position from the chain 3 upwardly and inwardly, respectively, and bear a gripper bearing 17. The carriers 8 could also be provided pivotably to the transport chain, in which they could be brought into the area of the pick-up position 23 in the shown position over guide, in which the gripping layer 19 is in the vincinity of the shaft 16 of the direction changing wheel 4. The distance of the gripper bearing 17 to the direction changing shaft 16 is small, and is preferrably between 5% and 30% of the radius of the direction changing wheels, for instance 1/7 of the radius, as is shown approximately in FIG. 4. In both gripping bearings 17 of the carrier 8, a pivot shaft 19 is journalled, to which a guide bracket 18 is provided which bears the gripper 9. This comprises a pair of grip fingers journalled to the guide bracket 18, and which are kept in a closed position by a spring 11, and also a clamping part 10 stretching parallel to the transport element 2, a bearing part 12 extending also parallel, and a spreading piece 13 extending upwardly. For stabilising of the grippers 9 approaching the pick-up position 23, rails 15 have been provided, on which the guide bracket 18 is shifting, and may be rolling by means of roll bodies not depicted in the drawings. In the direction changing area the spread parts 13 divert to a bell shaped spread guide 14, opening a gripper 9, so that the clamping parts 10 can grip the stem of the plant 22. When leaving the spread guide 14, the stem is clamped, and is pulled substantially vertically from the plant cavity 21 including the root ball in which the small distance between the shaft 16 and the rotation shaft 19 diminuishes the horizontal component such that only minimal forces work perpendicular to the growing direction of the plant 22. As the movement of the gripper 9 to the pick-up position 23 is delayed, so that for the damping of the delay of the transport part 6 leading away the gripper 9 can be elastically resilient in the direction perpendicular to the rotation shaft 19.

On at least one transport chain 3 control pins 30 are provided for each gripper, and which extend outwardly. These extend along the transport part 6 leading away of the control apparatus 31 (FIG. 1, 3) of which the construction and the function will be closely elucidated with the help of FIG. 6-8. The control unit 31 comprises a number of guide plates 32, which number is equal to the number of pitches between longitudinal rows in the plant box 20, which guide plates 32 are journalled pivotably parallel to each other around rotation shafts 33, and which have been mutually connected by means of a coupling rod 34. The axis of pivot of the guide plate 32 is hence equal to the width of the two length arrays of plants including the intermediate distance. A control pin 30 shown in FIG. 6 and which belongs to control unit 31 hits a guide plate 32 being in its left end position, so that a frame 1 is being pivoted around a vertical shaft 25 and a direction of the arrows shown in FIG. 6 until the control pin 30 can leave the oblique guiding channel formed by the guide plate 32. At this moment a plant 22 is being gripped and pulled upwardly in which the subsequent control pin 30 hits the next guide plate 32 after the picking up of the plant, so that the frame 1 is being pivoted over the next pitch between length arrays.

FIG. 7 shows the situation at the end of a perpendicular array in which the last plant 22 has been pulled upwardly. The following control pin 30 hits a pivot arm 36, which extends into an active, and thus controllable oblique position in the path of movement of the control pin 30 and is thus being rotated to a passive position. In the pivot arm 36, is a gear 37, which is guided by a closed chain 38. This surrounds a second gear provided on the shaft of rotation 33 of the outer guide plate 33 from the opposite outer guide plate 32, a gear 37 of the second pivot arm 36 and other direction changing wheels not indicated. The rotation of the pivot arm 36 depicted in FIG. 7 by the control pin 37 causes the pivot of the second, in the drawing left pivot arm 36 to its active position, the rotation of all guide plates 32 to the second, right hand end position through a chain 38 as appears from FIG. 8. During the rotation of the guide plate 32, the transport unit 40 bearing the plant box 20 is shifted forwardly over the pitch of a perpendicular row, so that the plants 22 thereof are being transported to the pick-up position 23. The transport movement of the transport unit 40 is preferrably coupled with the movement of the chain 38. As a gripper 9 has been added to the control pin 30 initiating the rotation of the guide plates, and the position of the frame 1 is not being changed, this gripper grips the first plant 22 from the first row shifted forwardly and the stepwise rotation back of the frame 1 through the guide plates 32 leads to the picking up of all plants 22 of a perpendicular row. When this has been emptied, the control pin 30 hits the rotation arm 36 shown in the active position in FIG. 8, so that the rotation from the guide plates 32 back and from the right hand rotation arm 36 to the position according to FIG. 6 takes place, and the plant box is shifted forwardly over a following perpendicular row.

I claim:

1. An apparatus for relocating plants arranged in a predetermined order which are gripped one by one at a pick-up location and relocated to an unload station, said apparatus comprising:
   a frame;
   a continuous transport element coupled to said frame, said transport element being guided along direction changing guiding elements, each of said direction changing guiding elements being rotatable about a corresponding first rotating shaft;
   at least one carrier element coupled to said transport element;
   a gripper coupled to each carrier element, each of said grippers being rotatably suspended via a second rotating shaft extending through its corresponding carrier element, said second rotating shafts being essentially parallel to said first rotating shafts, wherein each of said grippers includes two spreadable grip-fingers which grip a plant including the rootball at the pick-up location and releases it at the unload station;

a gripper bearing disposed between each carrier element and said corresponding second rotating shaft; and whereby said gripper bearing is moved in a growing direction of the plants over a range substantially equal to a pick-up height of the plants;

wherein each of said direction changing guiding elements is circular and has a radius and one of said direction changing guiding elements is located at the pick-up station, and the distance between each of said gripper bearings and said corresponding first rotating shaft is less than the radii of the direction changing guiding element located at the pick-up station, and wherein a portion of said transport element leading away from the pick-up station is substantially parallel to the growing direction of the plants.

2. An apparatus as in claim 1, wherein said direction changing guiding elements are wheels, and wherein said transport element includes a pair of transport chains guided parallel to each other by said wheels, and wherein a plurality of said carriers are coupled to said chains.

3. An apparatus for relocating plants arranged in a predetermined order which are gripped one by one at a pick-up location and relocated to an unload station, said apparatus comprising:

a frame;

a continuous transport element coupled to said frame, said transport element being guided along direction changing guiding elements, each of said direction changing guiding elements being rotatable about a corresponding first rotating shaft;

at least one carrier element coupled to said transport element;

a gripper coupled to each carrier element, each of said grippers being rotatably suspended via a second rotating shaft extending through its corresponding carrier element, said second rotating shafts being essentially parallel to said first rotating shafts, wherein each of said grippers includes two spreadable grip-fingers which grip a plant including the rootball at the pick-up location and releases it at the unload station;

a gripper bearing disposed between each carrier element and said corresponding second rotating shaft; and whereby said gripper bearing is moved in a growing direction of the plants over a range substantially equal to a pick-up height of the plants;

wherein said direction changing guiding elements are wheels, and wherein said transport element includes a pair of transport chains guided parallel to each other by said wheels, and wherein a plurality of said carriers are coupled to said chains;

wherein each said gripper includes a grip-finger bearing coupled to said grip-fingers and extending parallel to said transport element, a clamping element disposed at a distal end of each of said grip-fingers, a spreading portion disposed at an opposite end of each of said grip-fingers, and a spring extending between said grip-fingers which biases said pair of clamping elements normally closed; and wherein each said gripper further includes a guide bracket in which said grip-finger bearing and said corresponding second rotating shaft are journalled.

4. An apparatus for relocating plants arranged in a predetermined order which are gripped one by one at a pick-up location and relocated to an unload station, said apparatus comprising:

a frame;

a continuous transport element coupled to said frame, said transport element being guided along direction changing guiding elements, each of said direction changing guiding elements being rotatable about a corresponding first rotating shaft;

at least one carrier element coupled to said transport element;

a gripper coupled to each carrier element, each of said grippers being rotatably suspended via a second rotating shaft extending through its corresponding carrier element, said second rotating shafts being essentially parallel to said first rotating shafts, wherein each of said grippers includes two spreadable grip-fingers which grip a plant including the rootball at the pick-up location and releases it at the unload station;

a gripper bearing disposed between each carrier element and said corresponding second rotating shaft; and whereby said gripper bearing is moved in a growing direction of the plants over a range substantially equal to the pick-up height of the plants;

wherein a portion of the transport element immediately adjacent to and leading towards the pick-up station is substantially horizontal and perpendicular to a substantially vertical portion of the transport element immediately adjacent to and leading away from the pick-up station.

5. An apparatus as in claim 4, wherein the plants can be picked-up from a plant container located on a horizontal base.

6. An apparatus for relocating plants arranged in a predetermined order which are gripped one by one at a pick-up location and relocated to an unload station, said apparatus comprising:

a frame;

a continuous transport element coupled to said frame, said transport element being guided along direction changing guiding elements, each of said direction changing guiding elements being rotatable about a corresponding first rotating shaft;

at least one carrier element coupled to said transport element;

a gripper coupled to each carrier element, each of said grippers being rotatably suspended via a second rotating shaft extending through its corresponding carrier element, said second rotating shafts being essentially parallel to said first rotating shafts, wherein each of said grippers includes two spreadable grip-fingers which grip a plant including the rootball at the pick-up location and releases it at the unload station;

a gripper bearing disposed between each carrier element and said corresponding second rotating shaft; and whereby said gripper bearing is moved in a growing direction of the plants over a range substantially equal to a pick-up height of the plants;

wherein a plurality of said carrier elements are disposed on said transport element, and wherein the plants are contained within movable plant boxes in cavities arranged in a plurality of longitudinal and transverse rows, and wherein said frame of said transport element is pivotable about a pivot axis so as to present each of said grippers successively to a filled cavity.

7. An apparatus as in claim 6, wherein said pivot axis extends parallel to the growing direction of the plants.

8. An apparatus as in claim 7, further comprising controller means for controlling the movement of said frame to index said frame over a pitch corresponding to the longitudinal rows of plant cavities.

9. An apparatus as in claim 8, wherein said controller means includes a stack of parallel guide-plates with one guide plate for every pitch between the longitudinal rows, each of said guide plates being pivotable about a guide plate pivot shaft between first and second slanting positions, and wherein said transport element includes an actuator pin disposed between each pair of adjacent carrier elements which sequentially coact with a corresponding one of said guide plates to cause said frame to pivot over the distances between longitudinal rows.

10. An apparatus as in claim 9, wherein said controller means further includes a pivot arm pivotable about a pivot arm shaft provided at each end of said stack of guide plates, wherein one of said pivot arms is adapted to be actuated by said actuator pin from an active initial position to a passive terminal position in which rotation of the pivot arm brings said stack of guide plates from the first slanting position to the second slanting position, and wherein the other of said pivot arms is adapted to be actuated by said actuator pin from a passive terminal position to its active initial position in which rotation of the pivot arm brings said stack of guide plates from the second slanting position to the first slanting position.

11. An apparatus as in claim 10, wherein the controller means further includes:
   a chain wheel disposed around each of the outermost guide plate pivot shafts in the stack;
   a chain wheel disposed around each of the pivot arm shafts;
   a first endless chain extending between the chain wheel disposed around one of said outermost guide plate pivot shafts and the chain wheel disposed around the corresponding pivot arm shaft;
   a second endless chain extending between the chain wheel disposed around the other of said outermost guide plate pivot shafts and the chain wheel disposed around its corresponding pivot arm shaft; and
   a coupling rod which couples all of the guide plates together.

12. An apparatus as in claim 11, wherein said controller means is located adjacent the portion of said transport element leading away from the pick-up station and wherein each of said actuator pins extends outwardly from said transport element.

13. An apparatus as in claim 10, further comprising translator means for translating the plant boxes with every rotation of said pivot arms.

14. An apparatus as in claim 1, wherein one of said direction changing guiding elements is located at the unload station, and the radius of the direction changing guiding element located at the pick-up station is less than the radius of the direction changing guiding element located at the unload station.

* * * * *